(12) United States Patent
Kahn et al.

(10) Patent No.: US 9,296,042 B2
(45) Date of Patent: Mar. 29, 2016

(54) PROCESS FOR PREPARING A COMPOSTION OF MIXED PARTICLES CONTAINING ELEMENTS FROM COLUMNS 13 AND 15

(75) Inventors: Myrtil Kahn, Toulouse (FR); Sebastien Graule, Creon (FR); Gregory Spataro, Albi (FR)

(73) Assignee: CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 315 days.

(21) Appl. No.: 13/994,200

(22) PCT Filed: Dec. 15, 2011

(86) PCT No.: PCT/EP2011/072975
§ 371 (c)(1),
(2), (4) Date: Aug. 1, 2013

(87) PCT Pub. No.: WO2012/080425
PCT Pub. Date: Jun. 21, 2012

(65) Prior Publication Data
US 2013/0309160 A1    Nov. 21, 2013

(30) Foreign Application Priority Data

Dec. 17, 2010   (FR) ..................... 10 04927

(51) Int. Cl.
*B22F 9/16*     (2006.01)
*C01B 21/06*    (2006.01)
(Continued)

(52) U.S. Cl.
CPC ............... *B22F 9/16* (2013.01); *C01B 21/0632* (2013.01); *C01B 21/072* (2013.01); *C01B 25/087* (2013.01); *C01G 15/00* (2013.01); *C01P 2004/04* (2013.01); *C01P 2006/40* (2013.01)

(58) Field of Classification Search
CPC   C01B 21/0632; C01B 21/072; C01B 25/087; C01G 15/00; B22F 9/16
See application file for complete search history.

(56) References Cited

U.S. PATENT DOCUMENTS 6,855,202 B2 *   2/2005   Alivisatos et al. .............. 117/68
2006/0078490 A1 *   4/2006   Shih et al. .................. 423/566.1

(Continued)

FOREIGN PATENT DOCUMENTS

| JP | H01-024006 | 1/1989 |
| JP | 2006-143526 | 6/2006 |

(Continued)

OTHER PUBLICATIONS

Jennifer, Chia-Jen Hsieh, "Synthesis, Characterization, and Biotemplated Assembly of Indium Nitride and Indium Gallium Nitride Nanoparticles", Thesis for the Degree of Doctor of Philosophy in Materials, Science and Engineering, Massachusetts Institute of Technology, 2010, pp. 1-102, XP002638421.

(Continued)

*Primary Examiner* — Jun Li
(74) *Attorney, Agent, or Firm* — Young & Thompson (57) ABSTRACT

A process for preparing a composition of mixed crystalline particles from columns 13-15 in which a liquid solution is produced by solubilization in a non-aqueous solvent medium of at least one first precursor chosen from coordination complexes including at least one element E1 from column 13, then the liquid solution is brought into contact with at least one second precursor chosen from the hydrides of at least one element E2 from column 15.

13 Claims, 8 Drawing Sheets

(51) Int. Cl.
*C01B 21/072* (2006.01)
*C01G 15/00* (2006.01)
*C01B 25/08* (2006.01)

(56) References Cited

U.S. PATENT DOCUMENTS

2007/0256629 A1 11/2007 Van Patten et al.
2009/0264668 A1 10/2009 Tokumitsu
2010/0240770 A1* 9/2010 Qi et al. .................... 514/769

FOREIGN PATENT DOCUMENTS

WO 2006099386 A2 9/2006
WO 2008-016154 2/2008
WO 2009136974 A2 11/2009

OTHER PUBLICATIONS

Micic et al., "Synthesis, structure, and optical properties of colloidal GaN quantum dots", Applied Physics Letters, 1999, vol. 75, No. 4, pp. 478-480, XP000860658.
Battaglia et al., "Formation of High Quality InP and InAs Nanocrystals in a Noncoordinating Solvent", Nano Letters, 2002, vol. 2, No. 9, pp. 1027-1030, XP002496971.
International Search Report, dated Jan. 20, 2012, from corresponding PCT application.

* cited by examiner

PROCESS FOR PREPARING A COMPOSTION OF MIXED PARTICLES CONTAINING ELEMENTS FROM COLUMNS 13 AND 15

BACKGROUND OF THE INVENTION

1. Field of the Invention

The invention relates to a process for preparing a composition of so-called mixed crystalline particles, especially monocrystalline nanoparticles, including at least one element from column 13 (group III) and at least one element from column 15 (group V) of the table of the periodic system of the chemical elements.

2. Description of the Related Art

The production of such mixed crystalline particles under conditions which are economical and compatible with operation on an industrial scale represents a major challenge, especially in view of their diverse applications such as, for example, in satellite TV receivers, optical fibres for communications, CD readers, barcode readers, flat and LED screens, photovoltaic cells, etc.

Despite intensive research on the subject, all the known processes (see in particular Jennifer Chia-Jen Hsieh "Synthesis, characterization and biotemplated assembly of Indium nitride and indium gallium nitride" Massachusetts Institute of Technology, 16 Jul. 2010; Micic O I et al. "Synthesis, structure, and optical properties of colloidal GaN quantum dots" Applied Physics Letters, Vol. 74, No. 4, 26 Jul. 1999 pp. 478-480; US2007/256629) require treatment at high temperature (always above 100° C.).

In addition to physical processes at high pressure and high temperature, there has been proposed a reduction reaction in solution (see especially WO2006/099386) starting from a precursor salt of an element of group III ($GaCl_3$ in the example), a precursor formed of a mono-, di- or tri-alkyl compound of an element of group V (($C_2H_5)_3N$ in the example) or a precursor formed of a chelate of an element of group III with a mono-, di- or tri-alkyl compound of an element of group V, in the presence of a reducing agent ($KBH_4$ in the example, or a different metal hydride) in a solvent (acetonitrile or triethylamine in the example). In order to obtain crystalline nanoparticles, a temperature at least greater than 180° C. (200° C. in the example) is necessary. The synthesis can optionally be carried out in the presence of an encapsulating agent (TOPO in the example). Furthermore, subsequent steps of purification and extraction of the nanoparticles are necessary, especially in order to remove by-products such as KCl.

SUMMARY OF THE INVENTION

The inventors have now found, surprisingly, that it is possible to obtain directly in a single step not only mixed crystalline particles but even monocrystalline nanoparticles in colloidal suspension, simply by bringing precursors into contact under gentle temperature conditions.

The invention aims, therefore, to remedy the disadvantages of the prior art by proposing a process which makes it possible to obtain, in a single step, a pure composition of mixed crystalline particles from columns 13-15, especially a colloidal suspension of such monocrystalline particles. The invention aims in particular to propose a process which can be carried out at low temperature, especially at ambient temperature, and in the absence of salts and reducing agents that are liable to produce by-products that are difficult to remove.

In the following, the following terminology is used:

nanoparticle: any particle, whatever its shape, having at least a width and a thickness that are both less than 100 nm, typically from 1 nm to 20 nm;

non-aqueous solvent medium: any composition capable of forming a liquid solution when it is brought into contact with at least one compound such as a coordination complex, that composition being non-aqueous in the sense that water does not act as a solvent agent in that composition, which may nevertheless comprise traces of water; it may be in the liquid state initially or, on the other hand, may pass into the liquid state only after contact with the compound(s) to be solubilised; it may be simple, that is to say formed of a single compound, or, on the other hand, it may be complex and contain a plurality of compounds; in particular, it may contain not only one or more compound(s) acting as solvent agent but also any other compound not consumed by the reaction, which is substantially neutral with respect to the dissolution of the coordination complex(es), and which may or may not play a role in the reaction;

coordination complex of an element: any compound the structure of which consists of at least one atom of said element bonded to at least one complexing molecule or ion (anion) by a covalent, dative, hydrogen or electrostatic bond;

adduct: chemical species AB, each molecular entity of which is formed by direct combination of two distinct molecular entities A and B;

hydride: compound having at least one chemical bond between an atom of an element of the periodic table and a hydrogen atom.

The invention relates, therefore, to a process for preparing a composition of mixed crystalline particles including at least one element from column 13 and at least one element from column 15 of the table of the periodic system of the chemical elements, in which:

at least one precursor comprising at least one element E1 from column 13 is chosen, at least one precursor comprising at least one element E2 from column 15 is chosen, a liquid solution is prepared by solubilising in a non-aqueous solvent medium at least one first precursor chosen from the coordination complexes comprising at least one element E1 from column 13, in the presence of at least one compound, called a ligand, that does not have a reducing action with respect to the precursors and is chosen to facilitate the formation of mixed monocrystalline nanoparticles, said liquid solution is brought into contact with at least one second precursor chosen from the hydrides of at least one element E2 from column 15, and said liquid solution is subjected to reaction conditions capable of permitting contacting of the precursors and bringing about a reaction that produces mixed crystalline particles, characterised in that the reaction is carried out at a temperature below 100° C.

A process according to the invention allows mixed crystalline particles to be obtained directly, in one step, and can be carried out under gentle temperature conditions, especially at ambient temperature, without a reducing reaction (without modifying the oxidation number of the elements E1 and E2 of the starting precursors) and in the absence of any agent acting as a reducing agent for the nanoparticle-forming reaction that is carried out. Accordingly, advantageously and according to the invention, the nanoparticle-forming reaction is carried out in the absence of an agent acting as a reducing agent for the nanoparticle-forming reaction.

The inventors do not to date have a clear explanation for this surprising result. It would appear, however, that the exothermic decomposition in solution of the coordination complex forming the first precursor is such as to facilitate the synthesis, the latter probably being a reaction of the acid-base type, the hydride forming the second precursor acting as an acid and not acting as a reducing agent in the reaction (the hydride probably liberating $H^+$ protons).

In a process according to the invention, there is nothing to prevent the reaction from being carried out with a certain heat treatment and in the presence of other agents capable of facilitating solubilisation or the reaction. Nevertheless, according to the invention, the reaction is carried out at a temperature below 100° C. and in the absence of a reducing agent. In particular, said liquid solution is prepared in a non-aqueous solvent medium in the absence of an agent acting as a reducing agent for the nanoparticle-forming reaction. Solubilisation can be obtained by adding and mixing in at least one first precursor, and optionally at least one ligand, in a non-aqueous solvent (it being possible for the latter itself to be formed by a ligand or a mixture of ligands). It is to be noted that it is also possible to provide a prior step of synthesis in situ in the solvent medium of at least one first precursor and/or of at least one second precursor and/or of at least one ligand.

The other reaction conditions permitting the production of nanoparticles can vary. In particular, the reaction can be carried out both at atmospheric pressure and under pressure, it being possible for the value of the pressure to influence the temperature. The concentration of each precursor can vary and essentially determines only the quantity of nanoparticles obtained in the solvent medium. The duration of the reaction depends directly on the temperature, on the pressure, which influence the kinetics. The quantity of each ligand influences the crystalline quality of the nanoparticles obtained and their state of agglomeration.

Advantageously and according to the invention, the reaction is carried out at a temperature below or equal to 50° C., especially with stirring. In a preferred embodiment according to the invention, the reaction is carried out at ambient pressure and temperature, without heat treatment.

In order to prepare said liquid solution, each first precursor is chosen in particular according to the particles that are to be obtained. Accordingly, it is possible to use a single first precursor comprising a single element E1 from column 13, or a plurality of first precursors each comprising the same element E1 from column 13, or a single first precursor comprising a plurality of elements from column 13, or a plurality of first precursors each comprising an element E1 from column 13, the different elements of the different precursors being distinct.

Each first precursor is a coordination complex of at least one element E1 from column 13. In particular, a coordination complex can be formed of a compound of the organometallic type, an element E1 from column 13 acting as the metal in that compound (even though, strictly speaking, it does not constitute a metal).

Advantageously and according to the invention there is used at least one first precursor, especially each first precursor, preferably a single first precursor, chosen from the group of the coordination complexes comprising at least one element E1 from column 13 and at least one E1-A1 bond, where A1 is an element chosen from carbon, nitrogen, oxygen, hydrogen, phosphorus, silicon, sulfur and selenium.

Advantageously and according to the invention there is used at least one first precursor, especially each first precursor, preferably a single first precursor, chosen from the group of the complex coordination compounds comprising at least one element from column 13 and at least one group chosen from: the amides; the amidinates; the carbon-containing groups, especially alkyls, aryls, cyclopentadienyls, allyls, olefins, polyolefins, alkynes; the silyls; the oxygen-containing groups, especially carboxylates, carbonates, alcoholates; the hydrides; the phosphorus-containing groups; the sulfur-containing groups; the selenium-containing groups; as well as the amine, phosphine, oxygen-containing, sulfur-containing and selenium-containing adducts of the coordination complexes comprising at least one element E1 from column 13.

When E1 is gallium, a first precursor can advantageously be chosen from the gallium amides such as tris(dimethylamino)gallium(III): $[Ga(N(CH_3)_2)_3]_2$; the carbon-containing derivatives of gallium such as the gallium alkyls such as trimethylgallium: $[Ga(CH_3)_3]$; the gallium silyls such as tris(methylbis-tert-butyl)silyl gallium: $[Ga(Si(CH_3)({}^t(C_4H_9))_2)_3]$; the gallium carboxylates such as gallium stearate: $[Ga(OCOC_{17}H_{35})_3]$; the gallium alcoholates such as gallium isopropoxide: $[Ga(OCH(CH_3)_2)_3]$; the gallium hydrides such as dimethylgallium hydride: $[(CH_3)_2GaH]$; the phosphino gallium such as bis-(bis-(tert-butylphosphino)trimethylphenyl)gallium: $[Ga((CH_3)_3(C_6H_2))P^t(C_4H_9)_2)_2]$; the phosphine adducts of gallium such as trimethylgallium-trimethylphosphine: $[(CH_3)_3P.Ga(CH_3)_3]$.

When E1 is aluminium, a first precursor can advantageously be chosen from the aluminium amides such as bis(μ-dimethylamino)tetrakis(dimethylaminodialuminium) $[Al_2[\mu-N(CH_3)_2]_2[N(CH_3)_2]_4]$; the carbon-containing derivatives of aluminium such as the aluminium alkyls such as trimethylaluminium: $[Al(CH_3)_3]$, triethylaluminium: $[Al(C_2H_5)_3]$; the aluminium silyls such as tris(trimethylsilyl)aluminium: $[Al(Si(CH_3)_3)_3]$; the aluminium alcoholates such as aluminium isopropoxide: $[Al(OCH(CH_3)_2)_3]$; the aluminium carboxylates such as aluminium stearate: $[Al(OCOC_{17}H_{35})_3]$; the aluminium hydrides such as diisobutylaluminium hydride: $[(C_4H_9)_2AlH]$, lithium aluminium hydride: $[LiAlH_4]$; the phosphine adducts of aluminium such as trimethylaluminium-trimethylphosphine: $[(CH_3)_3P.Al(CH_3)_3]$; the amine adducts of aluminium such as dimethylamine-trimethylaluminium: $[(CH_3)_2NH.Al(CH_3)_3]$.

When E1 is indium, a first precursor can advantageously be chosen from the indium amides such as tris(trimethylsilylphenyl)amino indium: $[In(N(Si(CH_3)_3)(C_6H_5))_3]$; the carbon-containing derivatives of indium such as the indium alkyls such as trimethylindium: $[In(CH_3)_3]$, triethylindium: $[In(C_2H_5)_3]$; the amino indium such as dimethyl(methylphenylamino)indium: $[In(CH_3)_2(N(CH_3)(C_6H_5))]$; the indium amidinates such as tris-(N,N'-dicyclohexylacetamidinato)indium: $[In((C_6H_{11})N\!\!-\!\!C(CH_3)\!\!-\!\!N(C_6H_{11}))_3]$; the indium alcoholates such as indium isopropoxide: $[In(OCH(CH_3)_2)_3]$; the indium hydrides such as indium bis(diphenyl) amidinate hydride: $[((C_6H_5)_2N_2CH)_2InH]$; the amine adducts of indium such as trimethylamine-trimethylindium: $[(CH_3)_3N.In(CH_3)_3]$.

When E1 is boron, a first precursor can advantageously be chosen from the aminoboranes such as tris(diethylamino)borane: $[((C_2H_5)_2N)_3B]$, diethyl(ethyl-phenylamino)borane: $[B(C_2H_5)_2N((C_2H_5)(C_6H_5))]$; the carbon-containing derivatives of boron such as the boranes such as triethylborane: $[B(C_2H_5)_3]$; the amine-boranes such as triethylamine-triethylborane: $[(C_2H_5)_3N.B(C_2H_5)_3]$; the borazoles such as hexaethylborazole: $[((C_2H_5)NB(C_2H_5))_3]$; the borates such as trimethyl borate: $[(CH_3O)_3B]$; the borohydrides such as borohydride: $[BH_3]$, dimethylborohydride: $[((CH_3)_2BH]$; the boron sulfides such as borane dimethylsulfide: $[BH_3.S$ $(CH_3)_2$]; the selenoxoboranes such as β-diketiminatoselenoxoborane: [(HC(C($CH_3$))$_2$(N(2,6-($CH_3$)$_2$$C_6H_3$))$_2$)BSe].

When E1 is thallium, a first precursor can advantageously be chosen from the carbon-containing derivatives of thallium, especially the trialkylthallium such as triethylthallium: [Tl($C_2H_5$)$_3$]; the thallium carboxylates such as thallium methyldiacetate: [$CH_3$Tl(OCO$CH_3$)$_2$]; the phosphine adducts of thallium such as trimethylphosphine-trimethylthallium: [($CH_3$)$_3$Tl.P($CH_3$)$_3$]; the sulfide adducts of thallium such as trimethylthallium dimethylsulfide: [($CH_3$)$_3$Tl.S($CH_3$)$_2$]; the amine adducts of thallium such as trimethylamine-triphenylthallium: [($C_6H_5$)$_3$Tl.N($CH_3$)$_3$]; the oxygen-containing adducts of thallium such as thallium tripentafluorophenyloxy-bis(ethane): [($C_6F_5$)$_3$Tl.O($C_2H_5$)$_2$]; the nitrogen-containing adducts of thallium such as trimethylamine-triphenylthallium: [($CH_3$)$_3$N.Tl($C_6H_5$)$_3$].

When a plurality of elements E1 from column 13 have to be incorporated into the particles, it is advantageously possible to choose either a plurality of first precursors, or a first precursor from the coordination complexes containing a plurality of elements E1, such as, for example, pentamethylcyclopentadienylaluminium tri-tert-butylgallium: [($C_5$($CH_3$)$_5$H)Al→Ga($^t$($C_4H_9$))$_3$]; pentamethylcyclopentadienylindium tri-tert-butyl-aluminium: [($C_5$($CH_3$)$_5$H)In→Al($^t$($C_4H_9$))$_3$].

Furthermore, in a process according to the invention, said liquid solution is prepared from a solvent that is chosen to be compatible especially with each first precursor and with each second precursor. Accordingly, advantageously and according to the invention, there is used a solvent medium comprising an organic solvent chosen from THF, DMF, DMSO, diethyl ether, methyl tert-butyl ether, diisopropyl ether, toluene, anisole, acetone, benzene, trichloroethylene, ethyl acetate, heptane, hexane, pentane, cyclohexane, acetonitrile, chloroform, dichloromethane, dioxane, xylene.

In addition, each second precursor is also chosen in particular according to the particles that are to be obtained. Accordingly, it is possible to use a single second precursor comprising a single element E2 from column 15, or a plurality of second precursors each comprising the same element E2 from column 15, or a single second precursor comprising a plurality of elements from column 15, or a plurality of second precursors each comprising an element E2 from column 15, the different elements of the different precursors being distinct.

In any case, each second precursor is a hydride, that is to say a compound comprising at least one E2-H bond. Any compound belonging to the family of the hydrides of at least one element E2 from column 15 can be used as the second precursor. Those hydrides may or may not comprise other atoms or groups. It is to be noted that, in those hydrides, the element E2 from column 15 has a negative oxidation number, which remains unchanged during the reaction (in the particles that are obtained). Those hydrides therefore cannot act as a reducing agent in the reaction. Accordingly, advantageously and according to the invention, there is used at least one second precursor chosen from the group of the hydrides comprising at least one element E2 from column 15, at least one E2-H bond and at least one E2-A2 bond, where A2 is an element chosen from carbon, nitrogen, oxygen, hydrogen, phosphorus and silicon.

As the second precursor which can be used in a process according to the invention there can also advantageously be used a hydride, which can be described as a simple hydride, composed solely of hydrogen and an element E2 from column 15. Accordingly, advantageously and according to the invention, there is used at least one second precursor chosen from the group of the simple hydrides of formula $E2_nH_m$, E2 being an element from column 15, n and m being non-zero integers.

When E2 is arsenic there can advantageously be used a second precursor chosen from arsine: $AsH_3$ and phenylarsine: $AsH_2(C_6H_5)$.

When E2 is antimony there can advantageously be used a second precursor chosen from stibine: $SbH_3$ and 1-H-stibepine: $C_6H_6$SbH.

When E2 is bismuth, bismuthine: $BiH_3$ can advantageously be used as the second precursor.

When E2 is phosphorus there can advantageously be used a second precursor chosen from the phosphines such as phosphine: $PH_3$, methylphosphine: $CH_3PH_2$, tert-butylphosphine: $^t(C_4H_9)PH_2$ and all their derivatives.

When E2 is nitrogen, a first precursor can advantageously be chosen from ammonia $NH_3$.

Those hydrides are often gaseous. Accordingly, advantageously and according to the invention, at least one second precursor in the gaseous state is advantageously used.

In order to bring such a second precursor in the gaseous state into contact with said liquid solution, at least one second precursor in the gaseous state is bubbled into said liquid solution in a first variant according to the invention. In a variant or in combination, advantageously and according to the invention, said liquid solution is placed in a gaseous atmosphere containing at least one second gaseous precursor. According to another variant according to the invention, at least one second precursor is generated in situ in said liquid solution by adding thereto precursors of the second precursor(s). It is to be noted that at least one of said precursors can optionally be a reducing agent but is not involved directly in the nanoparticle-forming reaction as a reducing agent.

The invention makes it possible in particular to obtain mixed monocrystalline nanoparticles. To that end, advantageously and according to the invention, there is added to said liquid solution at least one compound, called a ligand, that does not have a reducing action with respect to the precursors and that is chosen to facilitate the formation of mixed monocrystalline nanoparticles. Advantageously and according to the invention, such a ligand is chosen to stabilise said mixed monocrystalline nanoparticles.

Advantageously and according to the invention, there is used at least one ligand chosen from the group formed of compounds comprising nitrogen-containing, carbon-containing, silyl-containing, sulfur-containing, phosphorus-containing, oxygen-containing, boron-containing groups.

By way of examples, advantageously and according to the invention, there is used at least one ligand chosen from the group formed of the amines, nitrogen oxides, amino alcohols, nitriles (in particular cyano), amino acids, imines (Schiff bases), diazo compounds, carbamates, ammoniums, cyanates, isocyanates, siloxanes, silanes, silazanes, ureas, carbonyls, hydroxyls, epoxides, cyclodextrins, glycosides, thiols, aminothiols, thiocyanates, diisothiocyanates, xanthates (R—OC(S)SR'), thioureas, sulfites, thionyls, thiosulfates, sulfates, phosphines, phosphine oxides, phosphine sulfides, phosphonates, phosphonic acids, phosphinates, phosphinic acids, phosphates, carboxylates, carboxylic acids, carbenes, alkynes, alkenes, arenes, and Lewis acids such as boranes and aminoboranes.

More particularly, advantageously and according to the invention, there is used at least one ligand chosen from the group comprising hexadecylamine, dodecylamine, octylamine, oleylamine, ethylenediamine, pyridine, octanethiol, dodecanethiol, hexadecanethiol, trioctylphosphine, trioctylphosphine oxide, octanoic acid, myristic acid, stearic acid, oleic acid, lauric acid, hexylphosphonic acid, tetradecylphosphonic acid, poly(ethylene glycol) bis(3-propylamine) of formula $H_2C_3H_6[-OCH_2CH_2]_n-OC_3H_6NH_2$ and having a molar mass of the order of 1500 g·mol$^{-1}$, poly(ethylene glycol) bis(2-ethylamine) of formula $H_2C_2H_4[-OCH_2CH_2]_n-OC_2H_4NH_2$ and having a molar mass of the order of 3000 g·mol$^{-1}$ to 10,000 g·mol$^{-1}$, α-(2-ethylamine)-methoxy(ethylene glycol) of formula $H_3C[-OCH_2CH_2]_n-OC_2H_4NH_2$ and having a molar mass of the order of 750 g·mol$^{-1}$, poly(ethylene glycol)dioic of formula $HOOC-CH_2[-OCH_2CH_2]_n-O-CH_2-COOH$ and having a molar mass of the order of 600 g·mol$^{-1}$, methyl ether poly(ethylene glycol)oic of formula $H_3C[-OCH_2CH_2]_n-O-CH_2-COOH$ and having a molar mass of the order of 3000 g·mol$^{-1}$.

Advantageously and according to the invention, a reactor (containing said liquid solution containing each first precursor) is fed with each second precursor for a period not exceeding 10 hours, especially of the order of 1 hour. Each second precursor thereby dissolves at least partially in the liquid solution. The reaction mixture is then allowed to react for a period of from 1 hour to 30 days, especially for a period of the order of 8 days, in order to obtain mixed particles, especially nanoparticles in colloidal solution.

The particles are obtained directly in suspension in the solvent, especially in colloidal suspension, and it is sufficient to evaporate off the liquid phase, which is wholly volatile, to obtain a solid composition which can be used directly. It is to be noted in this connection that the residues of the first precursor and the ligands can be volatile compounds. In any case, it is possible to choose each first precursor so that it is volatile. It is likewise possible to choose each ligand so that it too is volatile, if its presence is detrimental to the intended use of the composition obtained according to the invention. In the latter case, however, there is a risk that the stability of the colloidal solution containing the particles will be affected thereby.

Furthermore, the compounds other than the mixed particles that are present in the reaction mixture at the end of the reaction, and therefore in the resulting composition (colloidal suspension), are in most cases non-reactive and neutral with respect to the various intended uses of a composition obtained by a process according to the invention. In particular, they are not halogenated. They likewise have the effect of stabilising the particles in colloidal suspension. Consequently, the resulting liquid composition (colloidal suspension) can likewise be employed directly in the majority of uses.

The invention relates also to a process characterised in combination by all or some of the features mentioned hereinabove or hereinbelow.

BRIEF DESCRIPTION OF THE DRAWING FIGURES

Other objects, features and advantages of the invention will become apparent upon reading the following examples and from the accompanying figures, which show the results thereof and in which.

DETAILED DESCRIPTION OF THE INVENTION

Protocol

In a chemical reactor, a first precursor that is the source of an element from column 13 (group III) is dissolved in an organic solvent under an inert atmosphere at ambient temperature. A ligand is introduced into this liquid solution. The second precursor in the form of a gas, which is the source of the element from column 15 (group V), is introduced into the chemical reactor:

- either by bubbling it into the liquid solution formed in the organic solvent and containing the first precursor and the ligand, under an inert atmosphere and at ambient temperature or with slight heating at a temperature below or equal to 50° C.,
- or by placing said liquid solution under a gaseous atmosphere of the second precursor at ambient temperature or with slight heating at a temperature below or equal to 50° C.,
- or by bubbling it into the liquid solution formed in the organic solvent and containing the first precursor and the ligand, under an inert atmosphere and at ambient temperature, and then, after stopping the bubbling, by heating said solution at a temperature below or equal to 50° C.,
- or by placing said liquid solution under a gaseous atmosphere of the second precursor at ambient temperature for a first period of time, and then heating said solution at a temperature below or equal to 50° C. for a second subsequent period of time.

Example 1

Preparation of GaAs Nanoparticles

Table 1 below summarises the reagents used and the quantities thereof in this example.

TABLE 1

|  | First precursor | Ligand | Second precursor |
|---|---|---|---|
| Formula | [Ga(N(CH$_3$)$_2$)$_3$]$_2$ | Octylamine | AsH$_3$ |
| n | 0.3 mmol | 1.2 mmol | Bubbling |
| Molar mass | 403.9 | 129.25 |  |
| Total mass | 120 mg | 150 mg |  |

It is to be noted that in the first precursor, Ga has an oxidation number equal to +3, and that in the second precursor, As has an oxidation number equal to −3, and that those oxidation numbers remain the same in the particles that are obtained. The solvent is THF. The reaction is carried out at ambient temperature. The second precursor is introduced into the liquid solution by bubbling.

Figure 1:
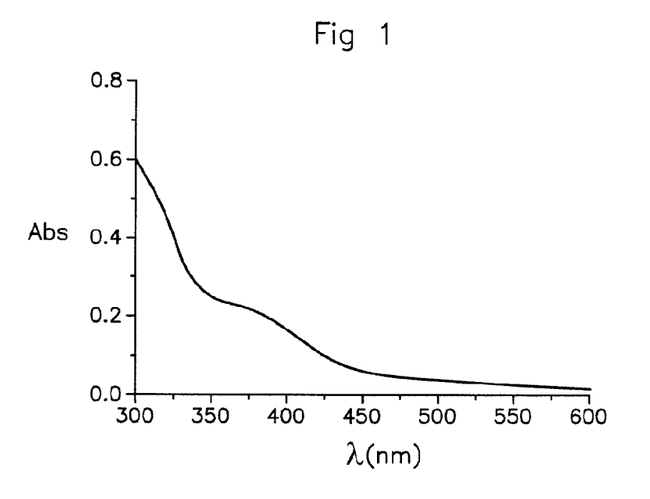
FIGS. 1, 4, 6, 9, 11, 13 and 15 are absorption spectra of compositions obtained by a process according to the various examples according to the invention.
Figure 2:
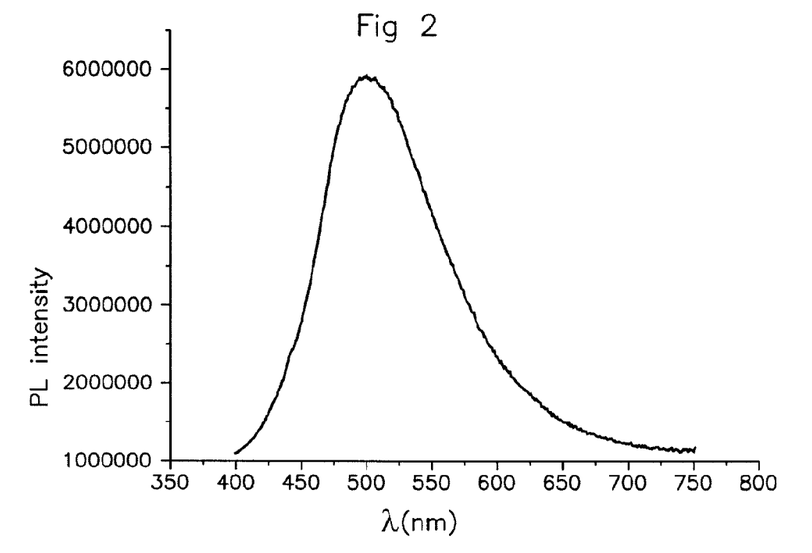
FIGS. 2, 5, 7, 10, 12, 14 are emission spectra of compositions obtained in the examples.
Figure 3:
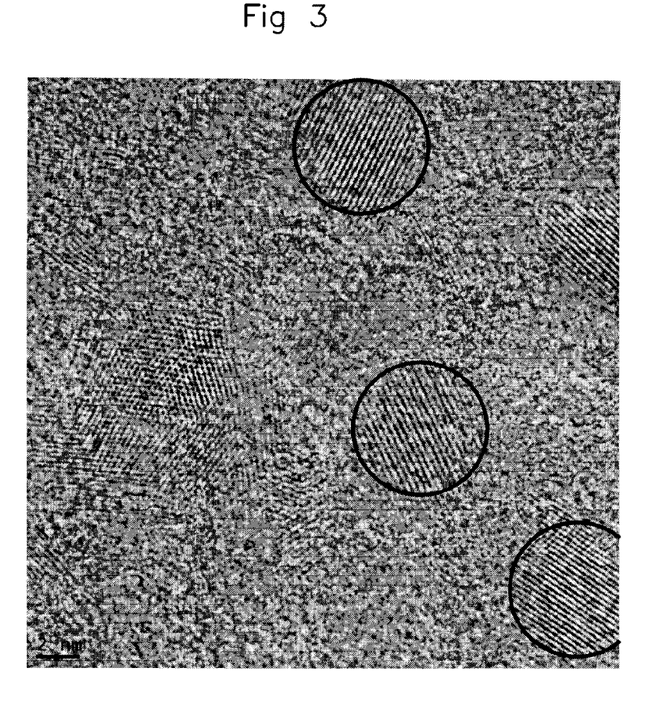
FIGS. 3, 8, 16 are views under an electron microscope of compositions obtained in the examples.

FIG. 1 shows the absorption spectrum of the colloidal suspension obtained; FIG. 2 shows the emission spectrum thereof (excitation wavelength 390 nm); FIG. 3 is a view under a transmission microscope (TEM) showing, as the spectra, the presence of monocrystalline GaAs nanoparticles.

Example 2

Preparation of GaAs Nanoparticles

Table 2 below summarises the reagents used and the quantities thereof in this example.

TABLE 2

|  | First precursor | Ligand | Second precursor |
|---|---|---|---|
| Formula | $[Ga(N(CH_3)_2)_3]_2$ | Hexadecylamine | $AsH_3$ |
| n | 0.3 mmol | 1.2 mmol | Bubbling |
| Molar mass | 403.9 | 241.46 | |
| Total mass | 120 mg | 289 mg | |

The solvent is THF. The reaction is carried out at ambient temperature. The second precursor is introduced into the liquid solution by bubbling.

Figure 4:
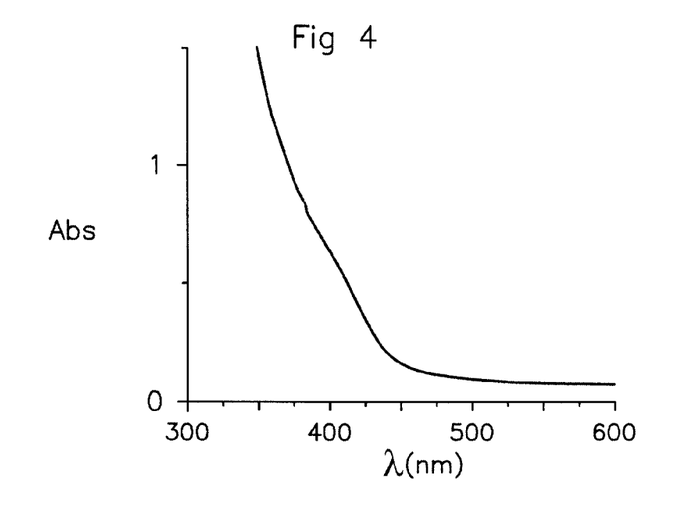
Figure 5:
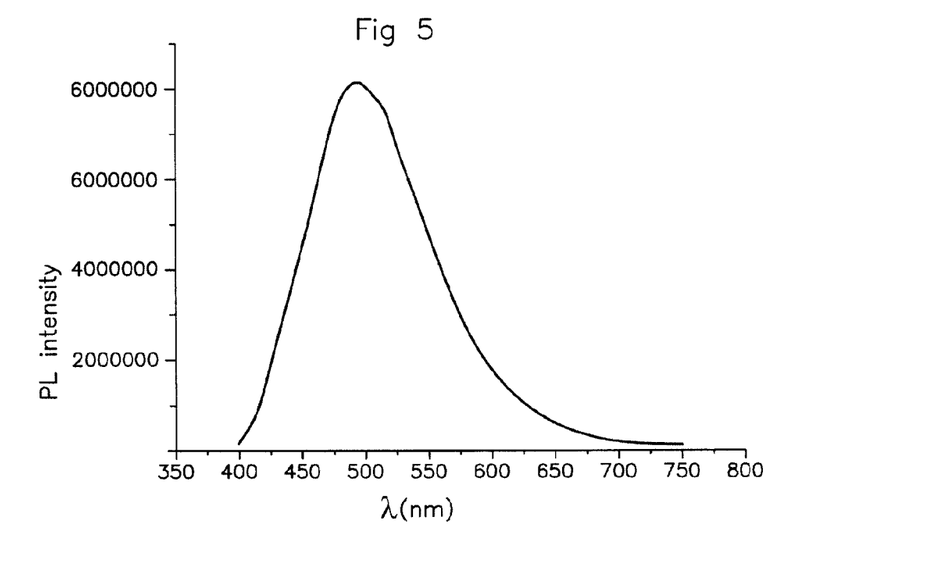

FIG. 4 shows the absorption spectrum of the colloidal suspension obtained; FIG. 5 shows the emission spectrum thereof (excitation wavelength 390 nm); these spectra show the presence of monocrystalline GaAs nanoparticles.

Example 3

Preparation of GaP Nanoparticles

Table 3 below summarises the reagents used and the quantities thereof in this example.

TABLE 3

|  | First precursor | Ligand | Second precursor |
|---|---|---|---|
| Formula | $[Ga(N(CH_3)_2)_3]_2$ | Hexadecylamine | $PH_3$ |
| n | 0.3 mmol | 1.2 mmol | Bubbling |
| Molar mass | 403.9 | 241.46 | |
| Total mass | 120 mg | 289 mg | |

The solvent is THF. The reaction is carried out at ambient temperature. The second precursor is introduced into the liquid solution by bubbling.

Figure 6:
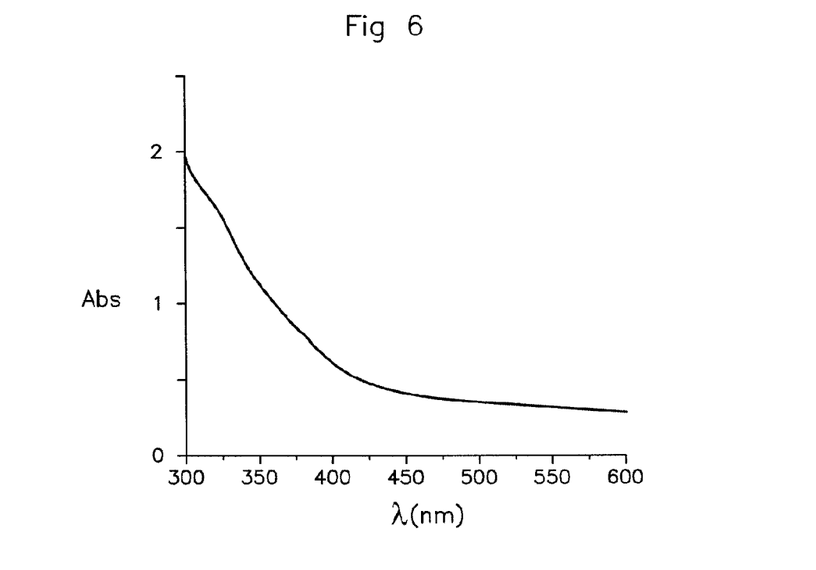
Figure 7:
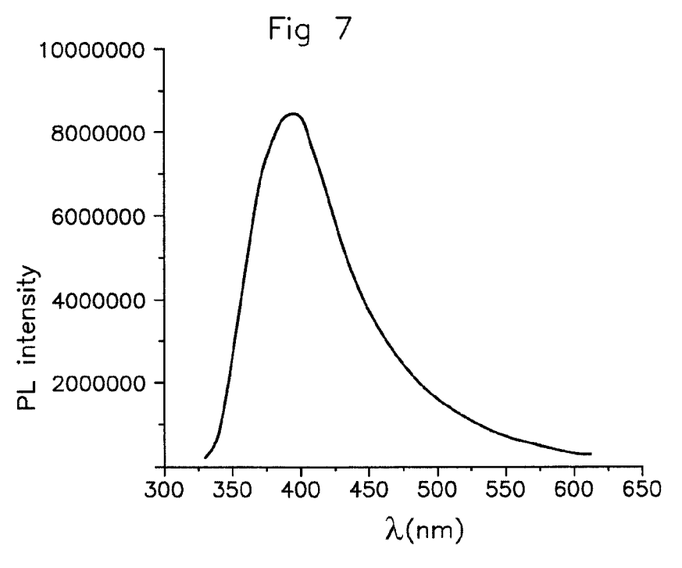
Figure 8:
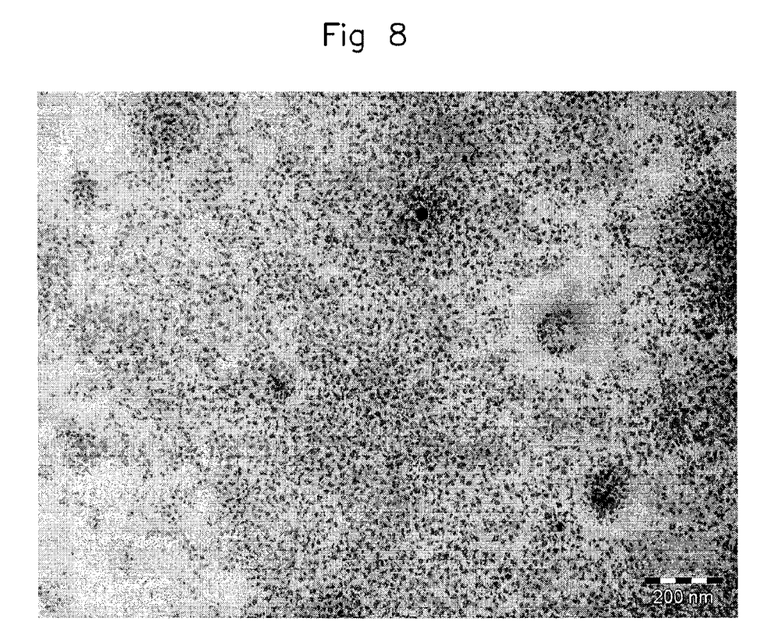

FIG. 6 shows the absorption spectrum of the colloidal suspension obtained; FIG. 7 shows the emission spectrum thereof (excitation wavelength 320 nm); FIG. 8 is a view under a high-resolution transmission microscope (HR-TEM) showing, as the spectra, the presence of GaP nanoparticles.

Example 4

Preparation of InAs Nanoparticles

Table 4 below summarises the reagents used and the quantities thereof in this example.

TABLE 4

|  | First precursor | Ligand | Second precursor |
|---|---|---|---|
| Formula | $In(CH_3)_3$ | Hexadecylamine | $AsH_3$ |
| n | 1.12 mmol | 1.12 mmol | Under atmosphere |
| Molar mass | 159.92 | 241.46 | |
| Total mass | 180 mg | 270 mg | |

The solvent is ether. The reaction is carried out at ambient temperature. The liquid solution is brought into contact with the second precursor under a gaseous atmosphere thereof with very slight overpressure.

Figure 9:
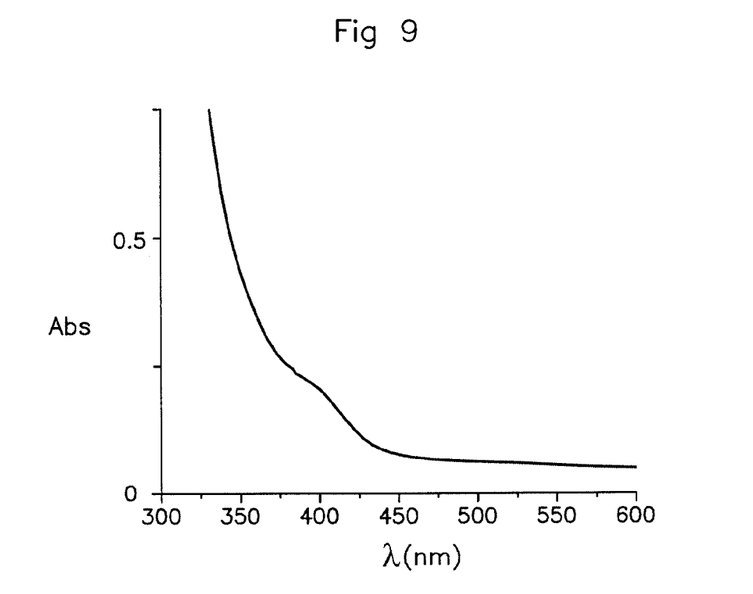
Figure 10:
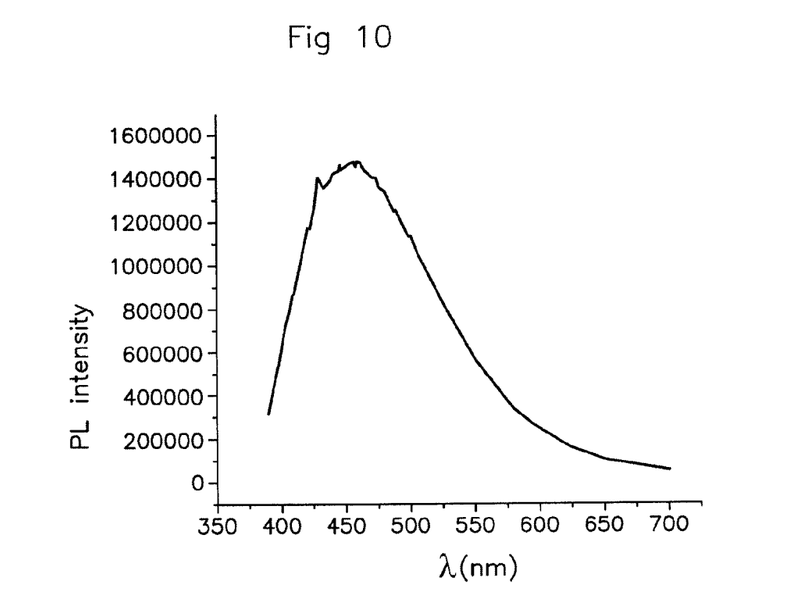

FIG. 9 shows the absorption spectrum of the colloidal suspension obtained; FIG. 10 shows the emission spectrum thereof (excitation wavelength 380 nm); these spectra show the presence of InAs nanoparticles.

Example 5

Preparation of InAs Nanoparticles

Table 5 below summarises the reagents used and the quantities thereof in this example.

TABLE 5

|  | First precursor | Ligand | Second precursor |
|---|---|---|---|
| Formula | $In(CH_3)_3$ | Hexadecylamine | $AsH_3$ |
| n | 1.12 mmol | 1.12 mmol | Bubbling |
| Molar mass | 159.92 | 241.46 | |
| Total mass | 180 mg | 270 mg | |

The solvent is THF. The reaction is carried out at ambient temperature. The second precursor is introduced into the liquid solution by bubbling.

Figure 11:
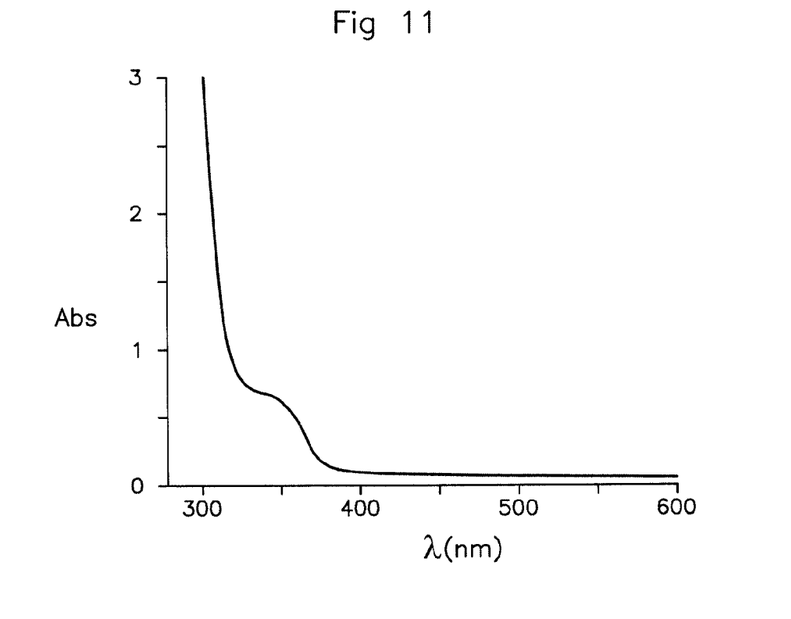
Figure 12:
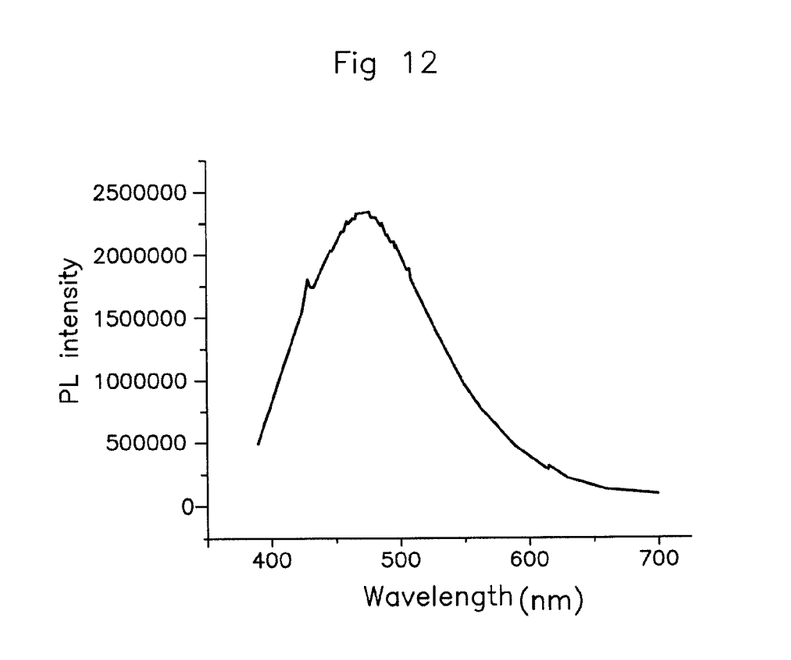

FIG. 11 shows the absorption spectrum of the colloidal suspension obtained; FIG. 12 shows the emission spectrum thereof (excitation wavelength 380 nm); these spectra show the presence of InAs nanoparticles.

Example 6

Preparation of GaN Nanoparticles

Table 6 below summarises the reagents used and the quantities thereof in this example.

TABLE 6

|  | First precursor | Ligand | Second precursor |
|---|---|---|---|
| Formula | $[Ga(N(CH_3)_2)_3]_2$ | Hexadecylamine | $NH_3$ |
| n | 0.3 mmol | 1.2 mmol | Bubbling |
| Molar mass | 403.9 | 241.46 | |
| Total mass | 120 mg | 289 mg | |

The solvent is toluene. The reaction is carried out at ambient temperature. The second precursor is introduced into the liquid solution by bubbling.

Figure 13:
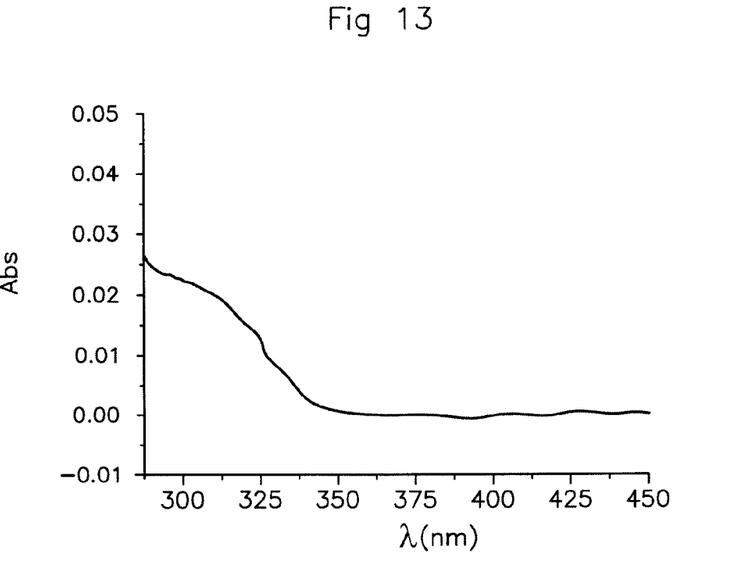
Figure 14:
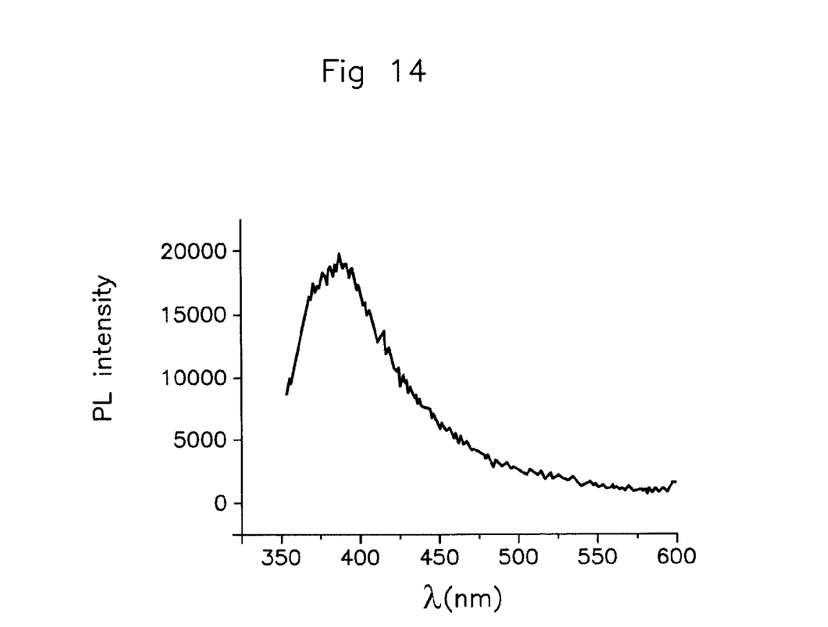

FIG. 13 shows the absorption spectrum of the colloidal suspension obtained; FIG. 14 shows the emission spectrum thereof (excitation wavelength 310 nm); these spectra show the presence of GaN nanoparticles.

Example 7

Preparation of GaN Nanoparticles

Table 7 below summarises the reagents used and the quantities thereof in this example.

TABLE 7

|  | First precursor | Ligand | Second precursor |
|---|---|---|---|
| Formula | $[Ga(N(CH_3)_2)_3]_2$ | Hexadecylamine | $NH_3$ |
| n | 0.3 mmol | 1.2 mmol | Bubbling |
| Molar mass | 403.9 | 241.46 | |
| Total mass | 120 mg | 289 mg | |

The solvent is THF. The reaction is carried out by bubbling of the second precursor at ambient temperature for one hour and then, after resting overnight, heating at 50° C. without bubbling for three days.

Figure 15:
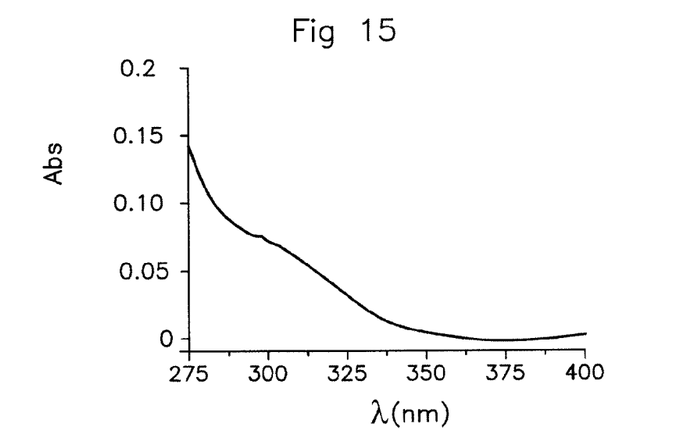
Figure 16:
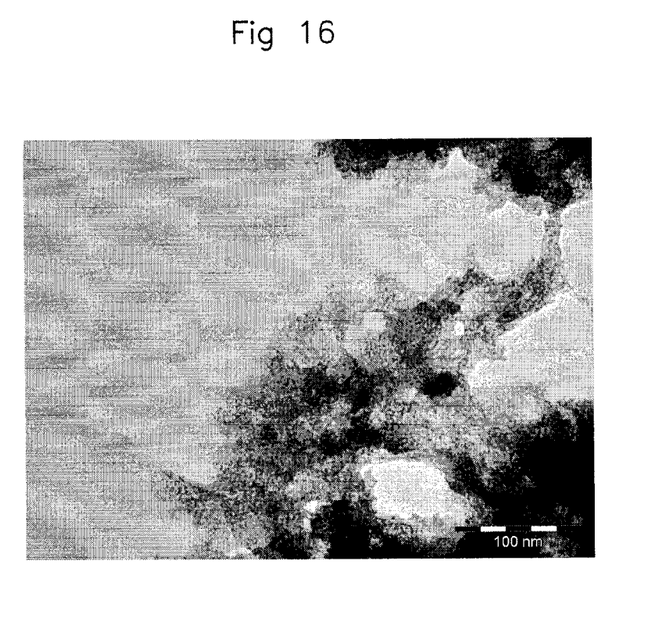

FIG. 15 shows the absorption spectrum of the colloidal suspension obtained; FIG. 16 is a view under a transmission microscope (TEM) showing, as the spectrum, the presence of monocrystalline GaN nanoparticles.

The invention claimed is:

1. A process for preparing a composition of mixed crystalline particles including at least one element from column 13 of the periodic table selected from the group consisting of gallium, aluminum, indium, boron, and thallium, and at least one element from column 15 of the periodic table selected from the group consisting of nitrogen, phosphorus, arsenic, antimony, bismuth, in which:
- at least one precursor comprising at least one element E1 from column 13 is chosen,
- at least one precursor comprising at least one element E2 from column 15 is chosen,
- a liquid solution is prepared by solubilising in a non-aqueous solvent medium at least one first precursor chosen from a coordination complex comprising at least one element E1 from column 13, in the presence of at least one compound, called a ligand, that does not have a reducing action with respect to the precursors and is chosen to facilitate the formation of mixed monocrystalline nanoparticles,
- said liquid solution is brought into contact with at least one second precursor chosen from the hydrides of at least one element E2 from column 15, and said liquid solution is subjected to reaction conditions capable of permitting contacting of the precursors and bringing about a reaction that produces mixed crystalline particles, wherein the reaction is carried out in the absence of an agent acting as a reducing agent for the nanoparticle-forming reaction, and at a temperature in a range from ambient temperature to 50° C.

2. The process according to claim 1, wherein the reaction is carried out at ambient pressure and temperature, without heat treatment.

3. The process according to claim 1, wherein there is used at least one first precursor chosen from the group of the coordination complexes comprising at least one element E1 from column 13 and at least one E1-A1 bond, where A1 is an element selected from the group consisting of carbon, nitrogen, oxygen, hydrogen, phosphorus, silicon, sulfur and selenium.

4. The process according to claim 1, wherein there is used at least one first precursor chosen from the group of the coordination complexes comprising at least one element E1 from column 13 and at least one group selected from the group consisting of the amides; amidinates; carbon-containing groups; silyls; oxygen-containing groups; hydrides; phosphorus-containing groups; sulfur-containing groups; selenium-containing groups; amine, phosphine, oxygen-containing, sulfur-containing and selenium-containing adducts of the coordination complexes comprising at least one element E1 from column 13.

5. The process according to claim 1, wherein at least one second precursor in the gaseous state is used.

6. The process according to claim 5, wherein at least one gaseous second precursor is bubbled into said liquid solution.

7. The process according to claim 5, wherein said liquid solution is placed under a gaseous atmosphere containing at least one gaseous second precursor.

8. The process according to claim 1, wherein there is used at least one second precursor selected from the group consisting of hydrides comprising at least one element E2 from column 15, at least one E2-H bond and at least one E2-A2 bond, where A2 is an element chosen from carbon, nitrogen, oxygen, hydrogen, phosphorus or silicon.

9. The process according to claim 1, wherein there is used at least one second precursor chosen from the group of the simple hydrides of formula $E2_nH_m$, E2 being an element from column 15, n and m being non-zero integers.

10. The process according to claim 1, wherein at least one ligand is added to said liquid solution.

11. The process according to claim 1, wherein there is used at least one ligand chosen from the group consisting of amines, nitrogen oxides, amino alcohols, nitriles (in particular cyano), amino acids, imines (Schiff bases), diazo compounds, carbamates, ammoniums, cyanates, isocyanates, siloxanes, silanes, silazanes, ureas, carbonyls, hydroxyls, epoxides, cyclodextrins, glycosides, thiols, aminothiols, thiocyanates, isothiocyanates, xanthates (R—OC(S)SR'), thioureas, sulfites, thionyls, thiosulfates, sulfates, phosphines, phosphine oxides, phosphine sulfides, phosphonates, phosphonic acids, phosphinates, phosphinic acids, phosphates, carboxylates, carboxylic acids, carbenes, alkynes, alkenes, arenes, and Lewis acids.

12. The process according to claim 1, wherein there is used at least one ligand chosen from the group consisting of hexadecylamine, dodecylamine, octylamine, oleylamine, ethylenediamine, pyridine, octanethiol, dodecanethiol, hexadecanethiol, trioctylphosphine, trioctylphosphine oxide, octanoic acid, myristic acid, stearic acid, oleic acid, lauric acid, hexylphosphonic acid, tetradecylphosphonic acid, poly (ethylene glycol) bis(3-propylamine) of formula $H_2NC_3H_6$[—$OCH_2CH_2$]$_n$—$OC_3H_6NH_2$ and having a molar mass of the order of 1500 g·mol$^{-1}$, poly(ethylene glycol) bis(2-ethylamine) of formula $H_2NC_2H_4$[—$OCH_2CH_2$]$_n$—$OC_2H_4NH_2$ and having a molar mass of the order of 3000 g·mol$^{-1}$ to 10,000 g·mol$^{-1}$, α-(2-ethylamine)-methoxy(ethylene glycol) of formula $H_3C$[—$OCH_2CH_2$]$_n$—$OC_2H_4NH_2$ and having a molar mass of the order of 750 g·mol$^{-1}$, poly(ethylene glycol) dioic of formula HOOC—$CH_2$[—$OCH_2CH_2$]$_n$—O—$CH_2$—COOH and having a molar mass of the order of 600 g·mol$^{-1}$, methyl ether poly(ethylene glycol)oic of formula $H_3C$[—$OCH_2CH_2$]$_n$—O—$CH_2$—COOH and having a molar mass of the order of 3000 g·mol$^{-1}$.

13. The process according to claim 1, wherein there is used a solvent medium comprising an organic solvent selected from the group consisting of THF, DMF, DMSO, diethyl ether, methyl tert-butyl ether, diisopropyl ether, toluene, anisole, acetone, benzene, trichloroethylene, ethyl acetate, heptane, hexane, pentane, cyclohexane, acetonitrile, chloroform, dichloromethane, dioxane, and xylene.

* * * * *